(12) United States Patent
Watté et al.

(10) Patent No.: US 11,428,868 B2
(45) Date of Patent: *Aug. 30, 2022

(54) OPTICAL FIBER AND WAVEGUIDE DEVICES HAVING EXPANDED BEAM COUPLING

(71) Applicant: CommScope Connectivity Belgium BVBA, Kessel-Lo (BE)

(72) Inventors: Jan Watté, Grimbergen (BE); Koen Huybrechts, Heverlee (BE)

(73) Assignee: COMMSCOPE CONNECTIVITY BELGIUM BVBA, Kessel-Lo (BE)

( * ) Notice: Subject to any disclaimer, the term of this patent is extended or adjusted under 35 U.S.C. 154(b) by 0 days.

This patent is subject to a terminal disclaimer.

(21) Appl. No.: 16/989,533

(22) Filed: Aug. 10, 2020

(65) Prior Publication Data

US 2020/0371293 A1    Nov. 26, 2020

Related U.S. Application Data

(63) Continuation of application No. 15/745,313, filed as application No. PCT/EP2016/066976 on Jul. 15, 2016, now Pat. No. 10,739,519.

(Continued)

(51) Int. Cl.
*G02B 6/30* (2006.01)
*G02B 6/36* (2006.01)
(Continued)

(52) U.S. Cl.
CPC ........... *G02B 6/305* (2013.01); *G02B 6/0288* (2013.01); *G02B 6/1228* (2013.01); *G02B 6/3652* (2013.01); *G02B 6/3885* (2013.01)

(58) Field of Classification Search
CPC ...... G02B 6/0288; G02B 6/1228; G02B 6/30; G02B 6/43; G02B 6/12002; G02B 6/122; G02B 6/305; G02B 6/3652; G02B 6/3885
(Continued)

(56) References Cited

U.S. PATENT DOCUMENTS

| 5,444,805 A | 8/1995 | Mayer |
| 6,628,865 B2 * | 9/2003 | Crafts ..................... G02B 6/30 |
| | | 385/49 |

(Continued)

FOREIGN PATENT DOCUMENTS

| JP | 2007-034007 A | 2/2007 |
| WO | 32/065600 A2 | 8/2002 |

OTHER PUBLICATIONS

International Search Report and Written Opinion of the International Searching Authority for corresponding International Patent Application No. PCT/EP2016/066976 dated Sep. 22, 2016, 13 pages.

(Continued)

*Primary Examiner* — Michael P Mooney
(74) *Attorney, Agent, or Firm* — Merchant & Gould P.C.

(57) ABSTRACT

An optical fiber connector includes a coupler having a waveguide section integrally formed with a fiber attachment section. At least one waveguide is disposed in the waveguide section and has a core dimension that is greater at the end of the waveguide at the fiber attachment section. The fiber attachment section has a first surface and at least one recess formed on the first surface for aligning one or more optical fibers with the at least one waveguide. In an optical fiber component, an optical substrate has a first end and a second end, and at least one waveguide input at the first end and at least one waveguide output at the second end. An integral input portion of the substrate at the first end has one or more input optical fiber alignment elements and an integral output portion of the substrate at the second end has one or more output optical fiber alignment elements. One or more input optical fibers are positioned in the one or more input optical fiber alignment elements. One or more output optical fibers (Continued)

positioned in the one or more output optical fiber alignment elements.

21 Claims, 11 Drawing Sheets

Related U.S. Application Data

(60) Provisional application No. 62/193,379, filed on Jul. 16, 2015.

(51) Int. Cl.
*G02B 6/028* (2006.01)
*G02B 6/122* (2006.01)
*G02B 6/38* (2006.01)

(58) Field of Classification Search
USPC .................................. 385/28, 50, 129–132
See application file for complete search history.

(56) References Cited

U.S. PATENT DOCUMENTS

| | | | |
|---|---|---|---|
| 7,283,696 | B2 | 10/2007 | Ticknor et al. |
| 9,223,095 | B2 | 12/2015 | Hodge |
| 9,405,076 | B2 | 8/2016 | Chen et al. |
| 9,405,079 | B2 | 8/2016 | Hodge |
| 9,541,708 | B2 | 1/2017 | Hodge |
| 9,563,026 | B2 | 2/2017 | Hodge |
| 9,625,654 | B2 | 4/2017 | Hodge et al. |
| 9,759,870 | B2 | 9/2017 | Chen et al. |
| 9,977,194 | B2 | 5/2018 | Waldron et al. |
| 2003/0072550 | A1 | 4/2003 | Sasaura et al. |
| 2004/0017976 | A1* | 1/2004 | Luo ............. G02B 6/1228 385/43 |
| 2006/0245694 | A1 | 11/2006 | Chen et al. |
| 2007/0223552 | A1 | 9/2007 | Muendel et al. |
| 2009/0154884 | A1 | 6/2009 | Chen et al. |
| 2010/0310214 | A1 | 12/2010 | Miyadera et al. |
| 2014/0185990 | A1 | 7/2014 | Hodge et al. |
| 2014/0286609 | A1 | 9/2014 | Hodge et al. |
| 2014/0294395 | A1 | 10/2014 | Waldron et al. |
| 2014/0321814 | A1 | 10/2014 | Chen et al. |
| 2014/0341510 | A1 | 11/2014 | Hodge |
| 2016/0054526 | A1 | 2/2016 | Hodge |
| 2016/0124158 | A1 | 5/2016 | Hodge |
| 2016/0341905 | A1 | 11/2016 | Chen et al. |
| 2016/0341908 | A1 | 11/2016 | Hodge |

OTHER PUBLICATIONS

Diez-Blanco, V. et al., "Femtosecond laser writing of optical waveguides with controllable core size in high refractive index glass", Appl. Phys. A., 88: 239-242 (2007).
Ehrt, D. et al., "Femtosecond-laser-writing in various glasses", Journal of Non-Crystalline Solids, 345-345: 332-337 (2004).
Ho, S. et al., "Single and Multi-Scan Femtosecond Laser Writing for Selective Chemical Etching of Glass Micro-Channels", Optical Society of America, 2 pages (2007).
Huang, H. et al., "Femtosecond fiber laser direct writing of optical waveguide in glasses", Proc. SPIE 8164, Nanophotonics and Macrophotonics for Space Environments V, 1-8 (2011).
Nazarathy, M. et al., "Performance evaluation of software defined transmitter and receiver", Adaptive Software Defined Terabit Transceiver for Flexible Optical Networks, ASTRON, 39 pgs (2016).
Papastergiou, G., "Public executive summary of the first Project Periodic Report D1.7", Adaptive Software Defined Terabit Transceiver for Flexible Optical, ASTRON, 1-7 (2014).
Papastergiou, G., "Public executive summary of the final Project Periodic Report D1.9", Adaptive Software Defined Terabit Transceiver for Flexible Optical Networks, ASTRON, 1-34 (2016).
Papastergiou, G., "Overview Presentation of the Overall Progress of the ASTRON Project", Adaptive Software Defined Terabit Transceiver for Flexible Optical Networks, ASTRON, 1-10 (2016).
Ponader, C. et al., "Origin of the refractive-index increase in laser-written waveguides in glasses", Journal of Applied Physics, 103: 063516-1-063516-5 (2008).
Rivas-Moscoso, J. et al., "Techno-economic analysis with respect to green aspects and cost D2.7", Adaptive Software Defined Terabit Transceiver for Flexible Optical Networks, ASTRON, 1-90 (2015).
Streltsov, A. et al., "Laser-written high-contrast waveguides in glass", Proc. of SPIE, 7366: 736611-1-736611-8 (2009).
Tomkos, I., Overview of Overall Progress and Issues, ASTRON Final Review Meeting, Adaptive Software Defined Terabit Transceiver for Flexible Optical Networks, ASTRON, 1-56 (2016).
Xu, L. et al., "Lateral gradient index microlenses written in ophthalmic hydrogel polymers by femtosecond laser micromachining", Optical Materials Express, 1(8): 1416-1424 (2011).
Zakynthinos, P. et al., "The EU Research Project ASTRON: Advanced Hybrid Integrated Devices to Realize Flexible Terabit Networking", Adaptive Software Defined Terabit Transceiver for Flexible Optical Networks, ASTRON, 1-13 (2013).
Papastergiou, G., "Public executive summary of the interim progress report D1.5", Adaptive Software Defined Terabit Transceiver for Flexible Optical Networks, ASTRON, 1-8 (2013).

* cited by examiner

OPTICAL FIBER AND WAVEGUIDE DEVICES HAVING EXPANDED BEAM COUPLING

CROSS-REFERENCE TO RELATED APPLICATION

This application is a Continuation of U.S. patent application Ser. No. 15/745,313, filed on Jan. 16, 2018, which is a National Stage Application of PCT/EP2016/066976, filed on Jul. 15, 2016, which claims the benefit of U.S. Patent Application Ser. No. 62/193,379, filed on Jul. 16, 2015 the disclosures of which are incorporated herein by reference in their entireties. To the extent appropriate, a claim of priority is made to each of the above disclosed applications.

BACKGROUND

Passive optical networks are becoming prevalent in part because service providers want to deliver high bandwidth communication capabilities to customers. Passive optical networks are a desirable choice for delivering high-speed communication data because they may not employ active electronic devices, such as amplifiers and repeaters, between a central office and a subscriber termination. The absence of active electronic devices may decrease network complexity and/or cost and may increase network reliability.

Fiber optic networks use passive fiber optic lines, typically connecting a central office to a number of end subscribers (also referred to herein as end user). The central office can additionally connect to a larger network such as the Internet and/or to a public switched telephone network. The network can also include fiber distribution hubs (FDHs) that use one or more optical splitters (e.g., 1-to-8 splitters, 1-to-16 splitters, or 1-to-32 splitters) that generate a number of individual fibers that may lead to the premises of an end user.

Prior solutions for connecting multiple optical fibers are typified by the MT-based family of ferrules and associated latching mechanisms such as the MPO and MTP connectors. The MT ferrule is a high precision part fabricated by transfer or injection molding. Each optical fiber has to be positioned into a dedicated molded hole of the MT ferrule. The position and diameter of the fiber locating holes are held to a tight tolerance, for example less than around 3 µm. The fibers are fixed with adhesive after being loaded into the molded holes of the ferrule. The face of the connector is then precisely polished. The connector is then overmolded with a cover. Each cover is configured with complementary snap-fit elements to permit two covers to be coupled together to make a connection between two bundles of optical fibers. For example, the ferrules may have one or more rows of twelve fibers.

Many of these assembly processes are primarily manual, and therefore expensive and challenging to ramp into very high volume production. They require high precision molding, which increases the component cost. Additionally, they are susceptible to losses caused by particles of dust or dirt that may be present on the end surfaces of the fibers.

SUMMARY

According to some embodiments of the invention, an optical fiber connector includes a coupler having a waveguide section integrally formed with a fiber attachment section. The waveguide section has a first end proximate the fiber attachment section and a second end distal from the fiber attachment section. At least a first waveguide is disposed in the waveguide section to lead light between the first end of the waveguide section and the second end of the waveguide section. The at least a first waveguide has a first core cross-section at the first end of the waveguide section and a second core cross-section at the second end of the waveguide section. The second core cross-section has an area larger than an area of the first core cross-section. The input section has a first surface and at least one recess formed on the first surface for aligning an optical fiber with a respective waveguide of the waveguide section. According to other embodiments of the invention, a method of manufacturing an optical coupler includes forming at least a first waveguide in a substrate, where the substrate has a first end portion and a second end portion. The at least a first waveguide has a first core cross-section proximate the first end portion and a second core cross-section at the second end portion. An area of the first core cross-section is less than an area of the second core cross-section. The method also includes forming integrally on the substrate at least a first optical fiber aligning feature at the first end portion. The at least one optical fiber aligning feature is capable of aligning at least a first optical fiber core of at least a first optical fiber with a respective at least a first waveguide.

Other embodiments of the invention are directed to an optical fiber component that includes an optical substrate having a first end and a second end. The optical substrate has at least one waveguide input at the first end and at least one waveguide output at the second end. An integral input portion of the substrate at the first end has one or more input optical fiber alignment elements and an integral output portion of the substrate at the second end has one or more output optical fiber alignment elements. One or more input optical fibers are positioned in the one or more input optical fiber alignment elements. One or more output optical fibers are positioned in the one or more output optical fiber alignment elements.

Other embodiments of the invention are directed to a method of manufacturing an optical device. The method includes forming at least a first waveguide in a substrate. The substrate has a first end and a second end. The substrate comprises at least one waveguide input at the first end and at least one waveguide output at the second end. The method also includes forming integrally at the first end of the substrate at least one input optical fiber aligning feature. The at least one optical fiber aligning feature is capable of aligning at least one input optical fiber core of at least one input optical fiber with a respective at least one waveguide input. The method also includes forming integrally at the second end of the substrate at least one output optical fiber aligning feature. The at least one output optical fiber aligning feature is capable of aligning at least a first output optical fiber core of at least one output optical fiber with a respective at least one waveguide output.

DETAILED DESCRIPTION

Figure 1:
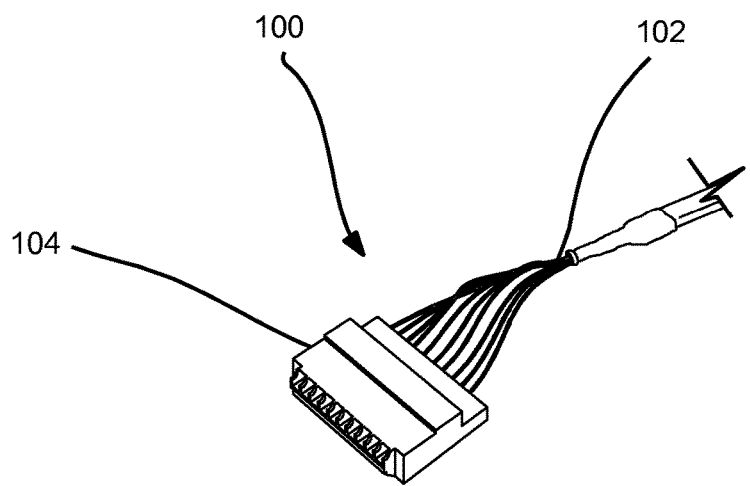
FIG. 1 schematically illustrates a waveguide coupler attached to a bundle of optical fibers, according to an embodiment of the invention.

Part of a fiber optic connector 100 according to one embodiment of the invention is illustrated in FIG. 1. One or more optical fibers 102 are connected to a waveguide coupler 104. The fibers 102 may be part of a fiber bundle, a fiber ribbon or may be arranged together in some other way. The waveguide coupler 104 is preferably made of glass, polymer or some other material that is optically transparent to light that propagates along the fibers 102 and is capable of incorporating waveguides formed within the coupler 104, as is discussed below.

Figure 2:
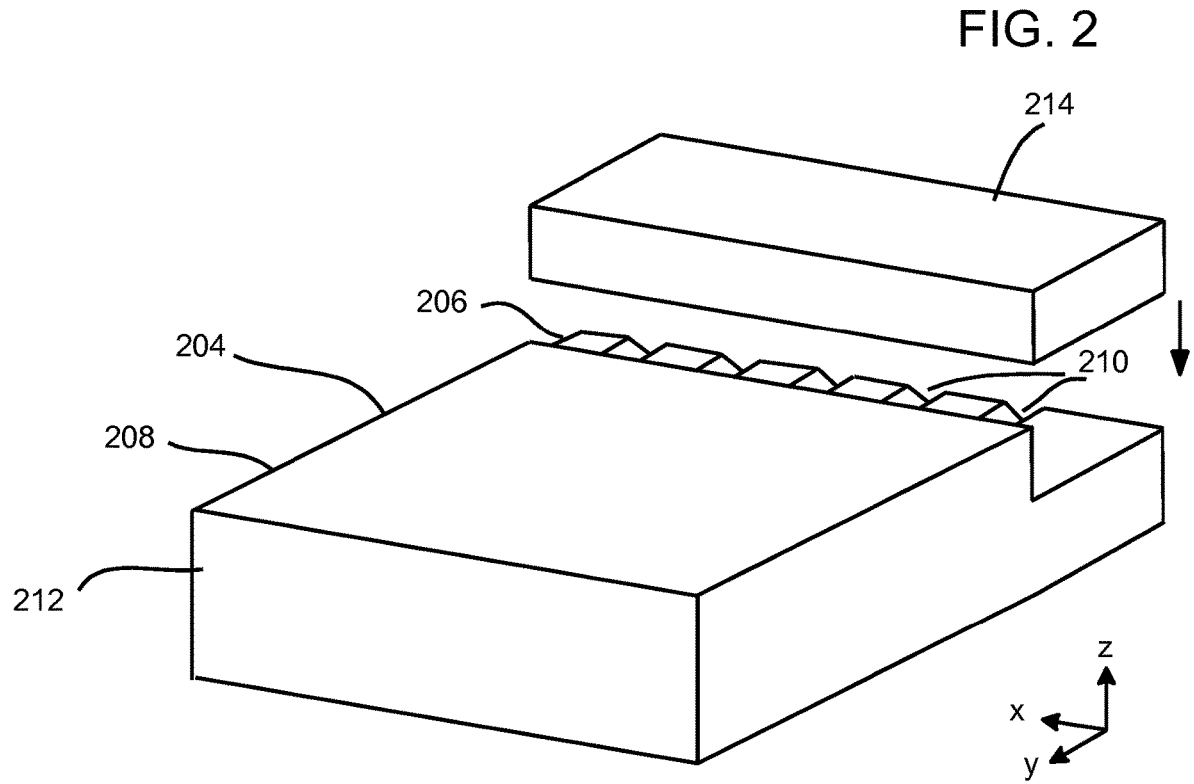
FIG. 2 schematically illustrates a waveguide coupler according to an embodiment of the present invention.

An embodiment of the waveguide coupler 204 is illustrated in FIG. 2. The coupler 204 has a fiber attachment section 206 at one end where optical fibers are attached to the coupler 204 and has a waveguide section 208 integrally formed with the fiber attachment section 206. For example, the fiber attachment section 206 and the waveguide section 208 are formed from a single piece of optical material. The fiber attachment section 206 is provided with one or more fiber alignment recesses 210 for receiving respective fibers and aligning the cores of the fibers with respective waveguides in the waveguide section 206. The waveguide section 208 is terminated at an output coupling face 212. An attachment section cover 214 may be attached over the attachment section 206 once fibers are aligned and fixed in place on the attachment section 206. The fibers may be fixed in place using any suitable technique, for example via the use of an adhesive such as a UV-cured adhesive. The attachment section cover 214 may also be attached via an adhesive such as a UV-cured adhesive. In other embodiments, the cover section may be configured to apply pressure to the fibers so as to maintain their positions in the alignment recesses 210.

In the illustrated embodiment the waveguide coupler 204 is provided with five fiber alignment recesses 210, but it will be appreciated that the waveguide coupler 204 may be provided with any desired number of fiber alignment recesses 210 to accommodate the number of optical fibers being connected to the coupler 204. For example, there may be 10, 20 or some other number of fibers being connected to the waveguide coupler 204, and each fiber will be attached and aligned to the waveguide coupler via its own alignment recess 210. Other arrangements may include 12 fibers, or multiples of 12 useful in MPO and MTP connectors.

Figure 3:
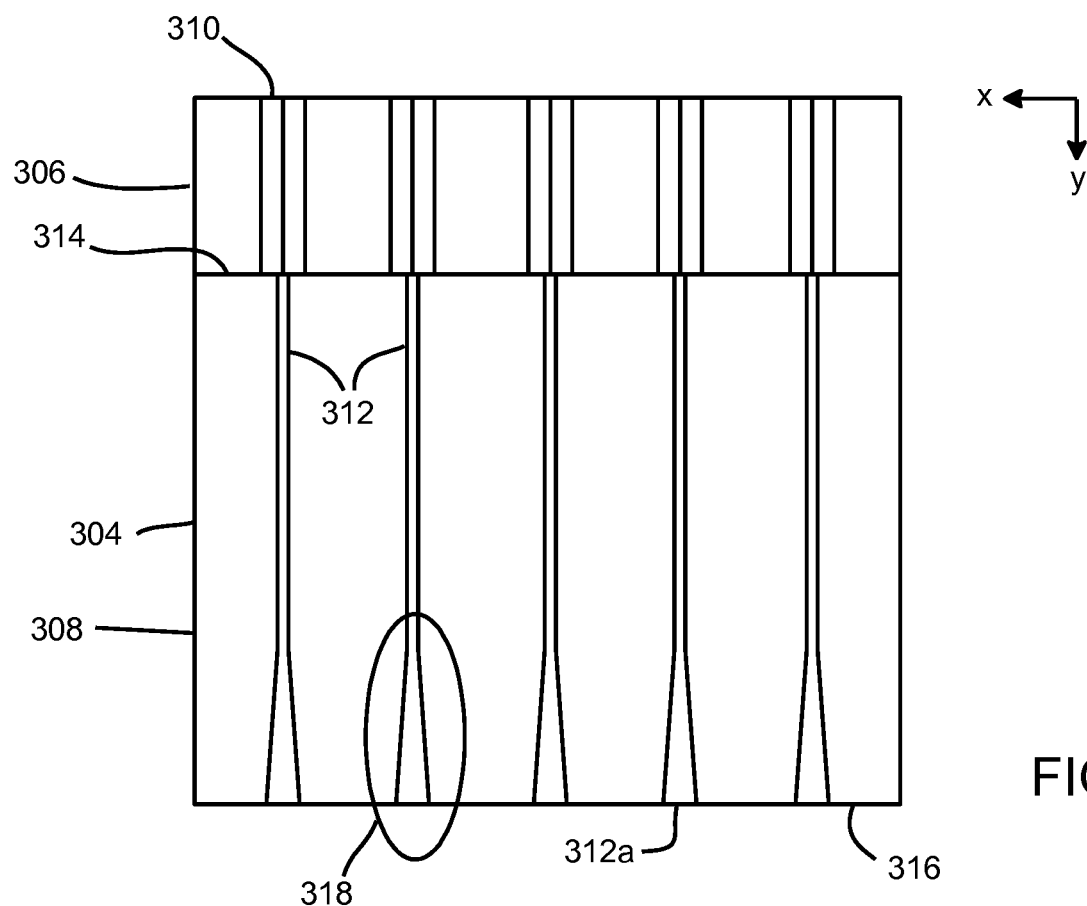
FIG. 3 schematically illustrates a top view of a waveguide coupler according to an embodiment of the present invention.

A plan view of an illustrated embodiment of the waveguide coupler 304 is presented in FIG. 3, showing a fiber attachment section 306 and a waveguide section 308. The waveguide section 308 includes a number of waveguides 312 positioned relative to the fiber alignment recesses 310 so that light passes from an aligned fiber in the fiber alignment recess 310 into a respective waveguide 312 in the waveguide section 304. The waveguides 312 lie between the first end 314 of the waveguide section 308 and the second end 316 of the waveguide section 308. Light propagating along the waveguide 312 from the first end 314 to the second end 316 is confined to the waveguide because the waveguide 302 has a higher refractive index than that of the surrounding material of the waveguide section 308. In the illustrated embodiment, the core of the waveguide 312 has a cross-sectional dimension at the first end 314 denoted as D1. Where the waveguide 312 has a circular cross-sectional core, D1 represents a core diameter, although the waveguide 312 may also have other cross-sectional shapes, such as elliptical or rectangular. At the second end 316 the waveguide 312 has a cross-sectional dimension of D2, where D2 is greater than D1. Thus, the cross-sectional dimension of the waveguide 312 is greater at the second end 316 than the first end 314, and is also larger than cores of the fibers attached to the coupler 204. The larger waveguide cores 312a at the second end 316 reduce the alignment accuracy required to couple light between couplers than is currently required for MT-type couplers, which require high accuracy for aligning the core of a first fiber to the core of a second fiber in order to couple light from the first fiber to the second fiber. Thus, the coupler of the present invention is easier to align than conventional couplers, and is therefore less expensive to assemble. In addition, any losses arising from the presence of dust between the two halves of a coupler are reduced due to the larger size of optical beam.

In the illustrated embodiment, waveguide 312 is provided with a tapered region 318 that includes a linear taper to expand the dimension of the waveguide core. Tapers having other profiles may also be used, for example a taper having a core that expands logarithmically or as a series of steps.

Figure 4:
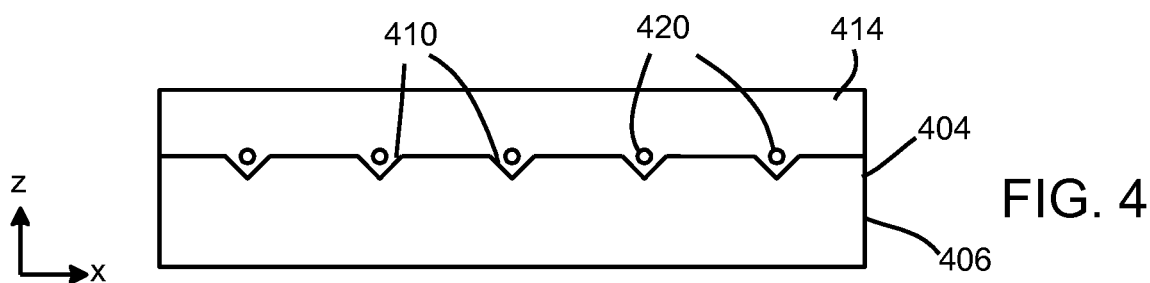
FIG. 4 schematically illustrates an input end view of a waveguide coupler according to an embodiment of the present invention.

A view of an input side of a coupler 404 is schematically illustrated in FIG. 4, showing a set of fiber alignment features 410 and a set of associated waveguide inputs 420 at the first end 414 of the waveguide section 404 that optically couple to fibers aligned in the fiber alignment features 410.

Figure 5:
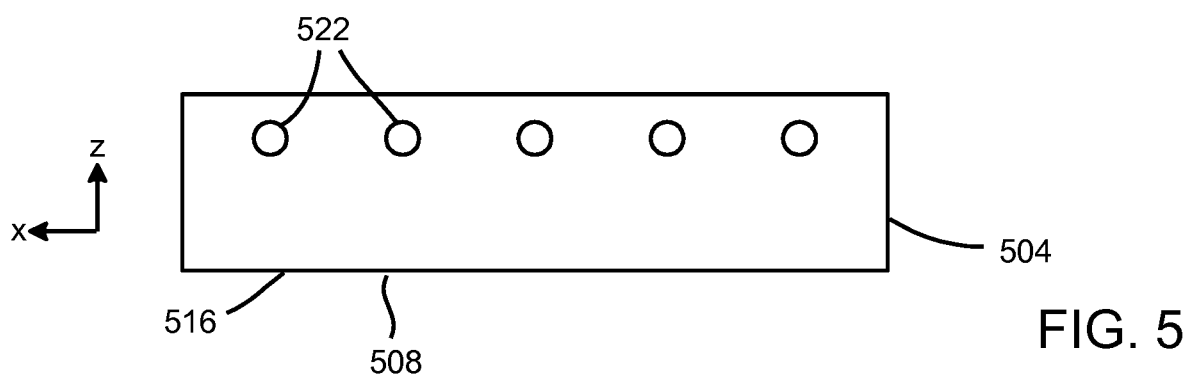
FIG. 5 schematically illustrates an output end view of a waveguide coupler according to an embodiment of the present invention.

A view of the second end 516 of the waveguide section 508 is schematically illustrated in FIG. 5, showing the expanded waveguide outputs 522 at the second end 516. In some embodiments the second end 516 may be provided with an antireflection coating to reduce reflective losses of light passing out of the coupler 504. In this embodiment, the waveguides 312 are parallel and define a single plane. It will be appreciated, however, that the waveguides 312 need not all lie in a single plane.

Figure 6:
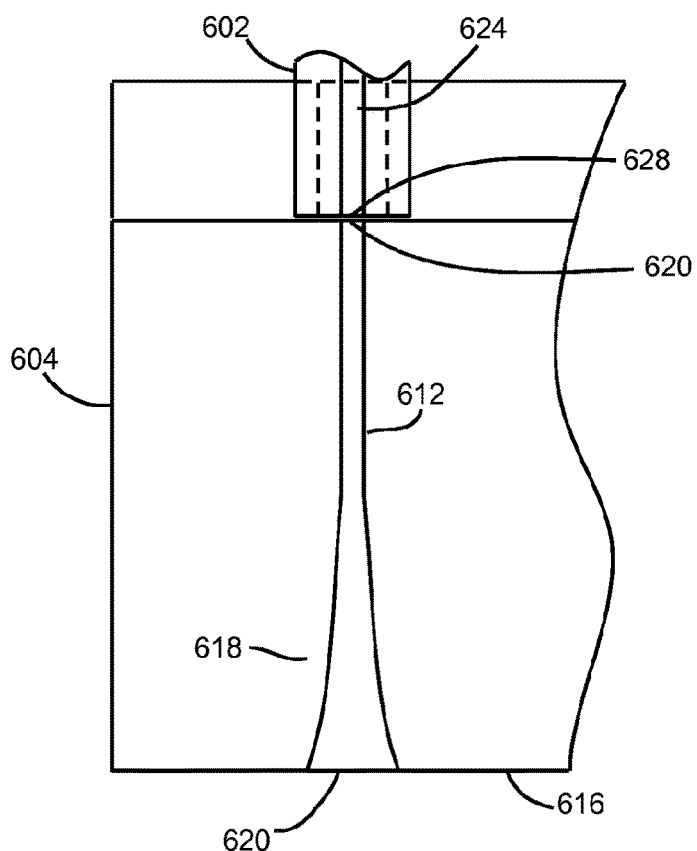
FIG. 6 schematically illustrates a top view of waveguide coupler according to another embodiment of the present invention.

Another embodiment of a waveguide 612 having a core cross-sectional dimension larger at the second end 616 of the coupler 604 is schematically illustrated in FIG. 6. The figure shows a fiber 602 having a fiber core 624 that is aligned to the waveguide input 620 resting in a fiber alignment recess 610 (dashed lines). It will be appreciated that although only one waveguide 612 is shown, the coupler 604 may be provided with another number of waveguides. In this embodiment, the waveguide 612 includes tapered region 618 having a nonlinear taper that leads to waveguide output 622. In some embodiments the tapered region 618 may have a taper profile that reduces or minimizes optical energy losses.

To reduce the effects of reflective losses at the output of the fiber core 624 and the waveguide input 620, the fiber core output 628 and/or the waveguide input 620 may be provided with antireflective coatings. In other embodiments, an index-matching fluid may be provided between the fiber 602 and the waveguide input 620 to reduce reflective effects.

Figure 7:
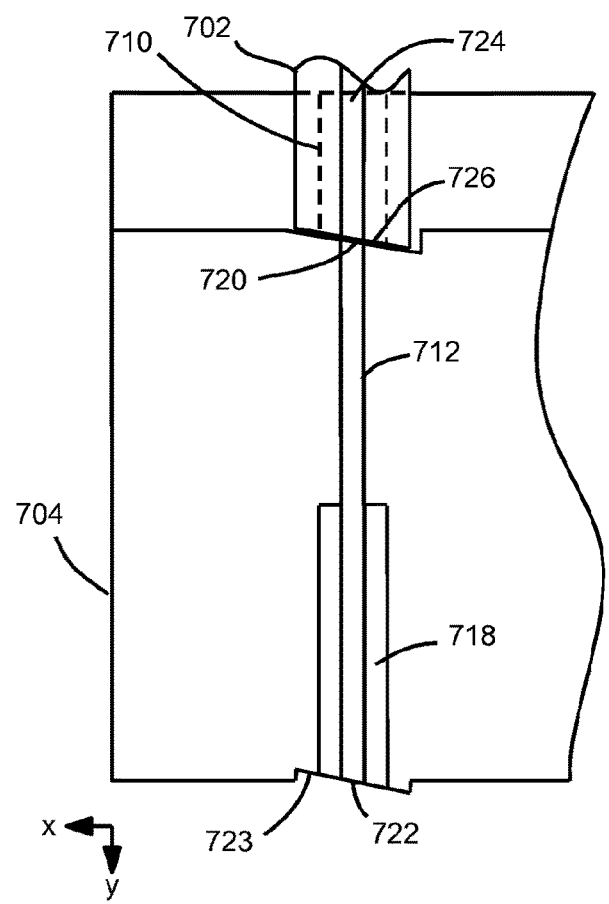
FIG. 7 schematically illustrates a top view of a waveguide coupler according to another embodiment of the present invention.

Another embodiment of coupler 704 is schematically illustrated in FIG. 7. The figure shows a fiber 702 having a fiber core 724 resting in a fiber alignment recess 710 (dashed lines), so that it is aligned to the waveguide input 720. It will be appreciated that although only one waveguide 712 is shown, the coupler 704 may be provided with another number of waveguides. In this embodiment, the waveguide 712 includes a graded index (GRIN) section 718 proximate the waveguide output 722. The GRIN section 718 permits light to exit the waveguide output 722 with a larger beam diameter than light exiting the fiber core 724. Furthermore, the GRIN section 718 may be tailored to collimate light exiting the waveguide output 722.

Also illustrated in FIG. 7 is another approach to coupling light from a fiber 702 into the coupler 704 that reduces the effects of reflected light. The waveguide input 720 and the fiber core output 726 are both angled to be non-perpendicular to the propagation axis of the light along the waveguide 712 (in the direction of the y-axis). In this embodiment light reflected from either the waveguide input 720 or the fiber output 726 is directed off the propagation path of the light signal.

In some embodiments, the waveguide output 722 may be provided with an angled face 723 that is non-perpendicular to the propagation direction of light along the waveguide 712 so that light reflected at the waveguide output 722 is directed off the propagation path of the light signal. It will be appreciated that the coupler 704 may be provided with either or both of the waveguide input 720 and waveguide output 722 angled, or neither may be angled.

Figure 8:
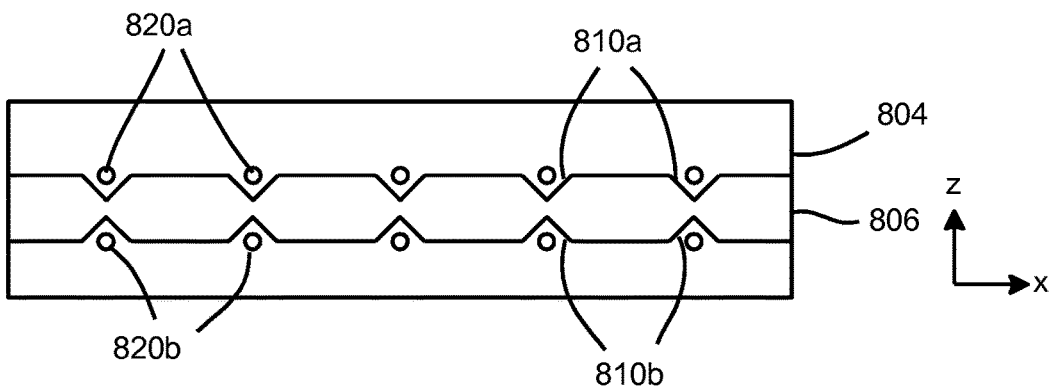
FIG. 8 schematically illustrates an input end view of a waveguide coupler having two rows of fibers as input, according to another embodiment of the invention.
Figure 9:
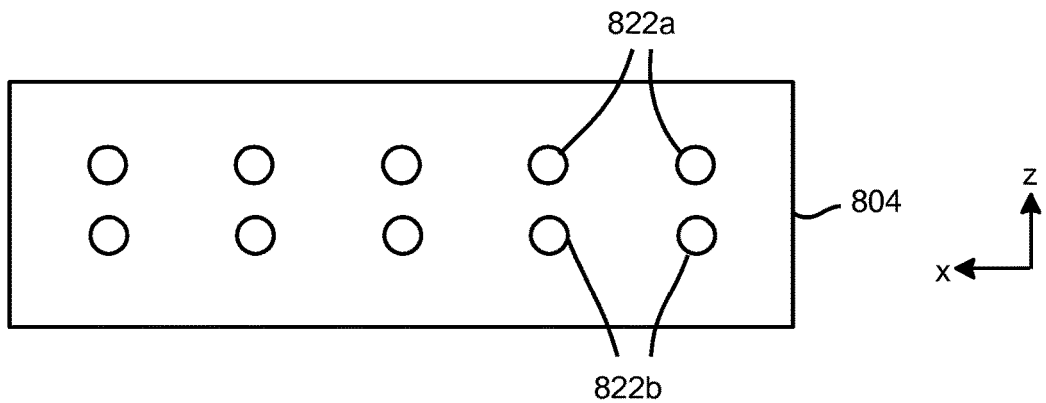
FIG. 9 schematically illustrates an output end view of a waveguide coupler having two rows of fibers as input, according to an embodiment of the invention.
Figure 10:
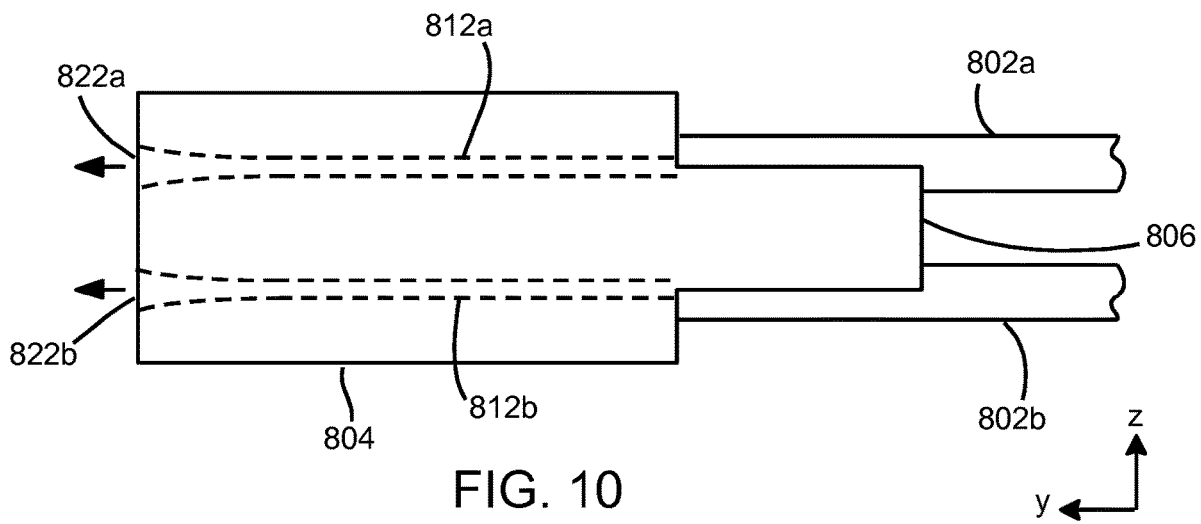
FIG. 10 schematically illustrates a side view of a waveguide coupler having two rows of fibers as input, according to an embodiment of the invention.

Another embodiment of coupler 804 is schematically illustrated in FIGS. 8-10. In FIG. 8, coupler 804 is provided with a first set of waveguide inputs 820a and a second set of waveguide inputs 820b that are not coplanar with the first set of waveguide inputs 822a. Fiber alignment recesses 810a and 810b are provided on the upper and lower side respectively of the fiber alignment section 806. The second end 816 of the coupler 804 has two sets of waveguide outputs 822a and 822b that correspond to the waveguide inputs 820a and 820b respectively. The waveguide outputs 822a and 822b are expanded with respect to the inputs 820a and 820b. FIG. 10 schematically illustrates a side view of a coupler 804 with fibers 802a and 802b aligned on the fiber attachment section 806 in respective fiber alignment recesses 810a and 810b. The fibers 802a and 802b may be fixed in place using, for example, a UV-cured adhesive. Also illustrated are waveguides 812a and 812b for guiding light from respective fibers 802a and 802b to the waveguide outputs 822a and 822b at the second end 816 of the coupler 804. In this embodiment, the first set of waveguides 812a define a first plane while the second set of waveguides 812b define a second plane that is displaced from the first plane.

Figure 11:
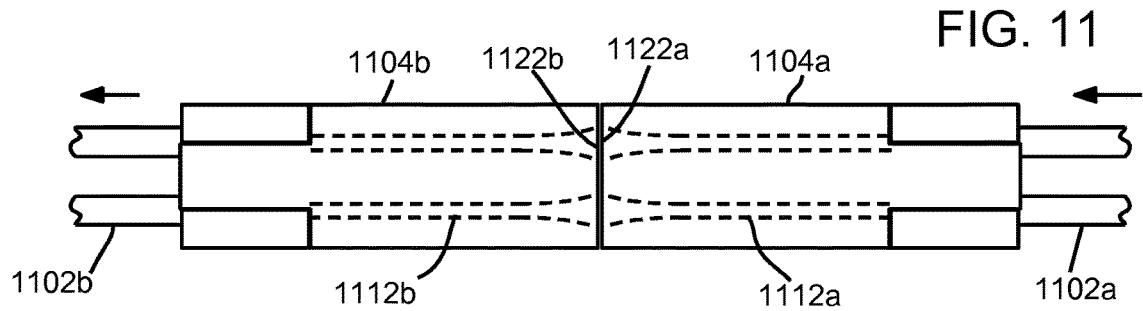
FIG. 11 schematically illustrate a side view of two waveguide couplers used for coupling light from one set of optical fibers to another set of optical fibers, according to an embodiment of the present invention.

FIG. 11 schematically illustrates how two couplers 1104a and 1104b may be used to couple light from a first set of fibers 1102a to a second set of fibers 1002b. Light from the first set of fibers 1102a passes into the waveguides 1112a in the first coupler 1104a and pass out of the expanded waveguide outputs 1122a in a direction towards the second coupler 1104b.

It will be appreciated that, although the terms "input" and "output" can connote a direction of light propagation, the use of such terms herein is not intended to restrict the invention to having light travel in only one particular direction, and light may travel in different directions through a device. Therefore, if light passes in one direction through a coupler, the light may pass into the device through an input and out of the device through an output. However, if the direction of light is reversed through the same device, the light may pass into the device through what was previously considered to be the output and out of the device through what was considered to be the input. Thus, the use of the terms "input" and "output" do not restrict the direction in which light can pass through a device.

Thus, in this embodiment the second coupler 1104a includes tapered waveguide 1112b with expanded ports 1122b through which light enters from the first coupler 1104a. The light passes along the waveguides 1112b in the direction such that the cores of the waveguides 1112b reduce in size to match the cores of the second set of fibers 1102b aligned to receive light from the waveguide 1112b.

Figure 12:
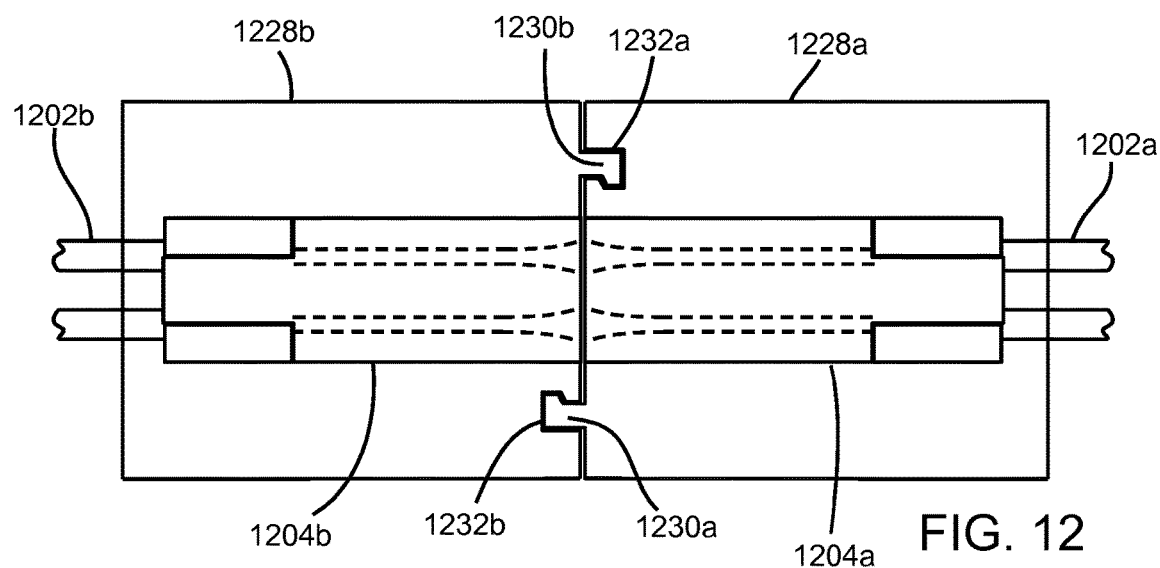
FIG. 12 schematically illustrates a side view of two waveguide couplers with interlocking covers according to an embodiment of the present invention.
Figure 13:
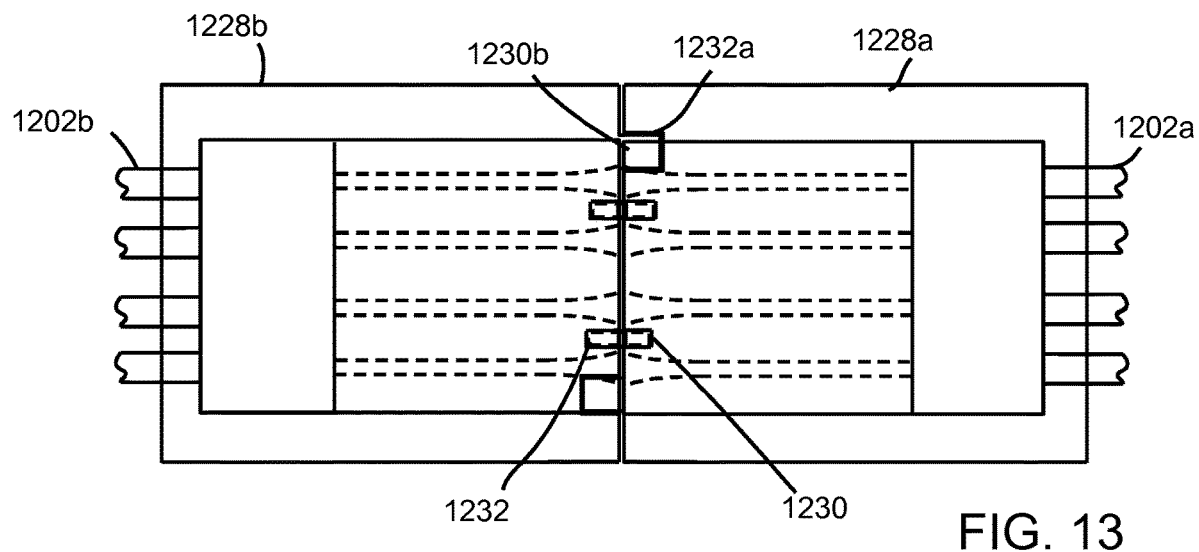
FIG. 13 schematically illustrates a top view of two waveguide couplers with interlocking covers according to an embodiment of the present invention.

The couplers 1104 and 1104b may be provided with covers, for example formed of plastic or some other type of material that can be molded. For example, the cover may be formed on the coupler via overmolding. One embodiment of such a cover is schematically illustrated in FIGS. 12 and 13, which show two couplers 1204a and 1204b for transmitting light between two sets of fibers 1202a and 1202b. Each coupler 1204a and 1204b is provided with a respective cover 1228a and 1228b. The covers 1228a and 1228b may be provided with mutual attachment mechanisms so that the covers 1228a and 1228b are held together in alignment. For example, in the illustrated embodiment attachment protrusions 1230a and 1230b fit into respective attachment receiving slots 1232b and 1232a to latch the two covers 1228a and 1228b together. It will be appreciated that other approaches to maintaining the relative positions of the covers 1228a and 1228b may be employed, for example via the use of clips, sleeves and the like.

In addition, the covers 1228a and 1228b, and/or the couplers 1204a and 1204b may be provided mechanisms to ensure the relative alignment of the couplers 1204a and 1204b. In the illustrated embodiment, each coupler 1204a and 1204b is provided with a locating pin recess 1230 and a locating pin that sits within the recess 1230 of each coupler 1204a and 1204b to align the couplers 1204a and 1204b.

Waveguides may be made in the coupler using any suitable process including, for example, femtosecond layer 3-D writing and ion implantation. Unlike planar technologies like diffusion and lithographic methods, direct writing of 3-D optical structures has been developed using ultrashort-pulse lasers, for example having pulse lengths in the sub-picosecond regime. Such lasers are generally referred to as femtosecond lasers pulse in the lasers. It is understood that nonlinear absorption at the focal volume results in local densification of the material which results in a local refractive index increase. The region of material thus treated is limited in volume due to the nonlinear mature of the interaction and by optical control of the lateral dimensions of the beam. Furthermore, the power level of the writing laser can be set such that the longitudinal limits (along the direction of the propagation of the writing beam) of the treated volume are small, close to the focus of the writing beam. Thus, 3-D optical structures can be written in substrates by writing one volume element (voxel) at a time. The amount by which the refractive index can be changed is dependent on the intensity of the light at the writing focus, as well as the speed at which the writing laser beam is translated within the substrate. Larger or smaller refractive index changes result from moving the writing laser focus within the substrate more slowly or more quickly. Since the light intensity is proportional to the pulse energy and inversely proportional to the focal area and the pulse length, changing any of these parameters can result in a concomitant change in the refractive index difference written in the substrate. Thus, various parameters of the writing laser beam can be controlled to create an optical structure in the substrate having a desired shape and refractive index difference relative to the surrounding, unwritten, substrate material. Femtosecond laser 3-D writing has recently been developed as a technique for manufacturing waveguide structures in glass and polymer substrates, and can be used to provide waveguides of a desired shape and voxels in the substrate material of a controlled refractive index difference. Furthermore, the refractive index difference of the written volume may contain spatial variations. A GRIN waveguide structure can be written, for example, with a relatively high refractive index close to the waveguide axis and the refractive index falling radially away from the waveguide axis.

In addition, the fiber alignment recesses may be formed in the coupler, in addition to the waveguides, using a 3-D laser processing approach, thus ensuring alignment of the fiber alignment features with the waveguides written in the coupler. For example, femtosecond laser treatment of glass is known to result in selective chemical etching. Thus, one possible method of fabricating the fiber alignment features is to process the substrate used for the coupler with femtosecond laser light prior to etching, and then etching the fiber alignment features. Such a method is exemplified in FIGS. 14A-E.

Figure 14A:
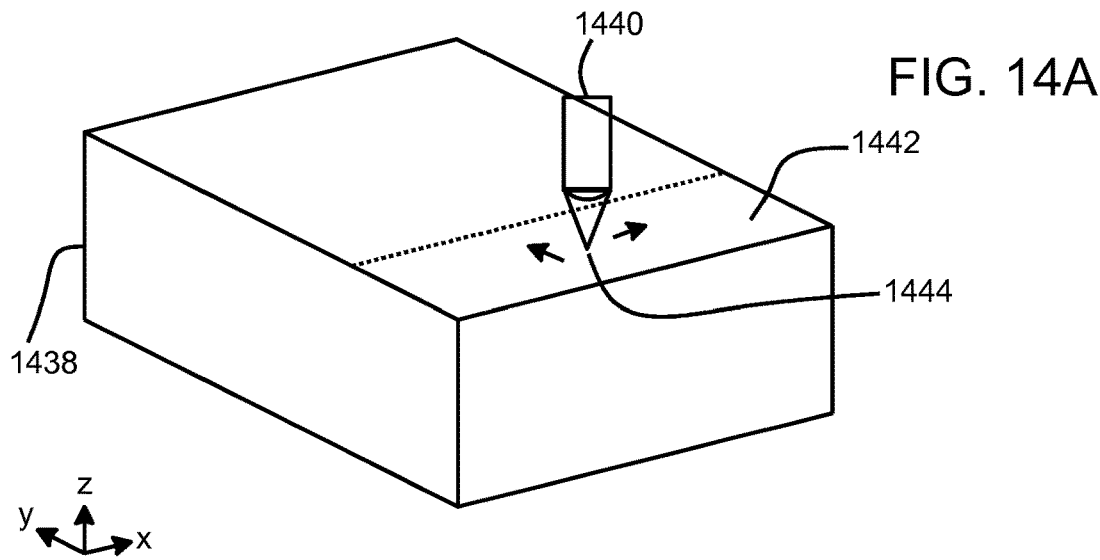
FIGS. 14A-14E schematically illustrate different stages in the fabrication of a device according to an embodiment of the present invention.
Figure 14B:
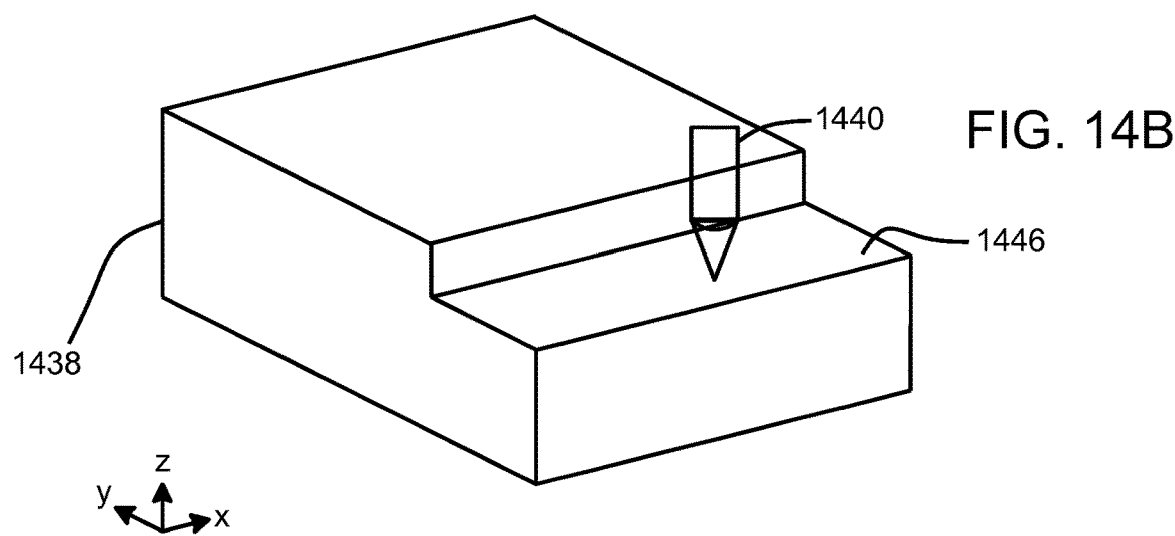
Figure 14C:
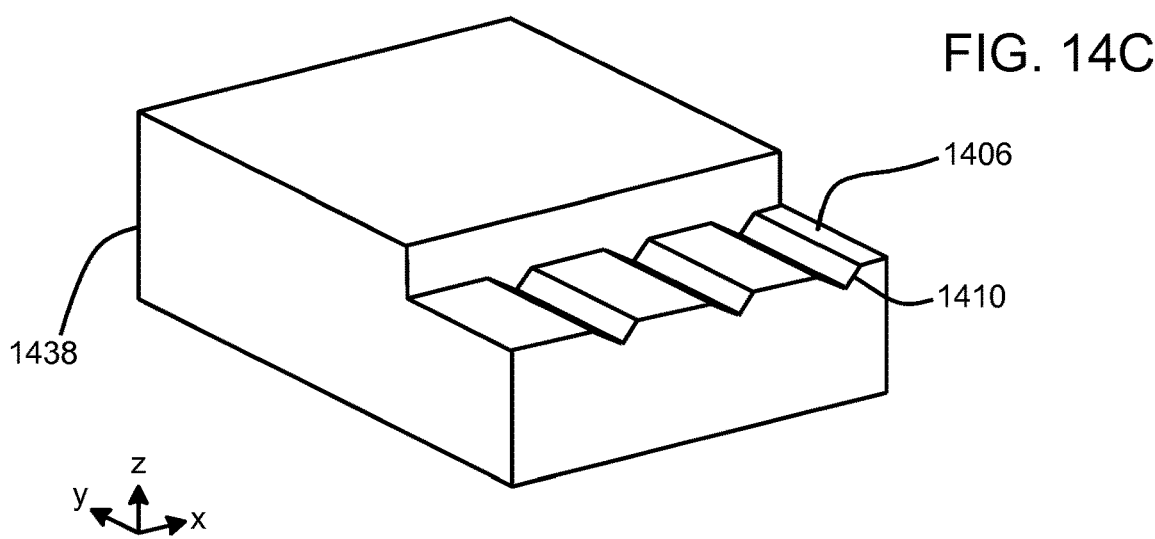

FIG. 14A shows a transparent substrate 1438 in which a waveguide structure is to be written. A femtosecond writing laser 1440 illuminates a portion 1442 of the substrate 1438 where the fiber alignment section is going to be fabricated. The relative positions of the laser focus 1444 and the substrate 1438 are changed, for example the substrate 1438 is mounted to an x-y-z stage to allow translation in the three dimensions. After laser treatment of the portion 1442, the portion 1442 can be etched to produce a ledge 1446, seen in FIG. 14B. The writing laser 1440 can then treat the remainder of the substrate 1438 with a V-groove pattern which is then etched to produce the substrate 1438 having a fiber attachment section 1406 provided with fiber alignment recesses 1410.

Figure 14D:
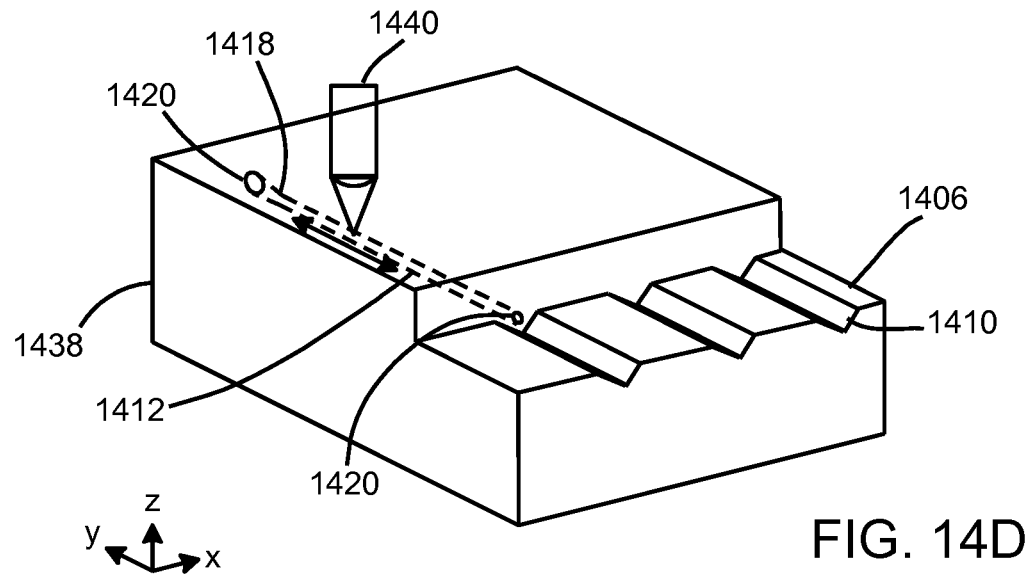
Figure 14E:
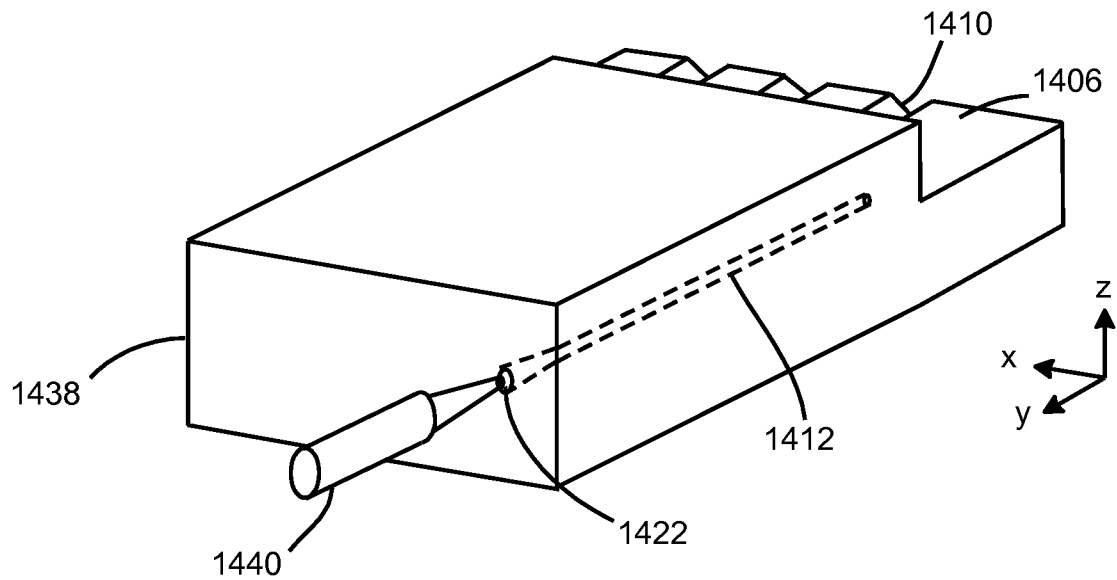

The laser 1440 is used to form the waveguides 1412 by 3-D writing within the substrate 1438, as shown in FIG. 14D, where the laser focus 1444 is moved laterally, in a direction perpendicular to the direction of the writing laser beam, to form the waveguide 1412. The laser 1440 can be used to write the entire waveguide 1412 from the waveguide input 1420 to the waveguide output 1422, including the expanded core section 1418, whether the expanded core section includes a taper in the waveguide 1412, or a GRIN section. Alternatively, the laser 1440 may write the waveguide 1412 in a longitudinal manner, where the laser focus 1444 is translated in a direction along the direction of the writing laser light, to form the waveguide 1412.

Accurate control of the translation stages that move the substrate 1438 relative to the laser focus 1444 can ensure that the waveguide inputs 1420 are positioned correctly relative to the fiber alignment recesses 1410 so that the waveguide inputs 1420 optically couple to the cores of the fibers that are attached in the fiber attachment section 1406.

Figure 15:
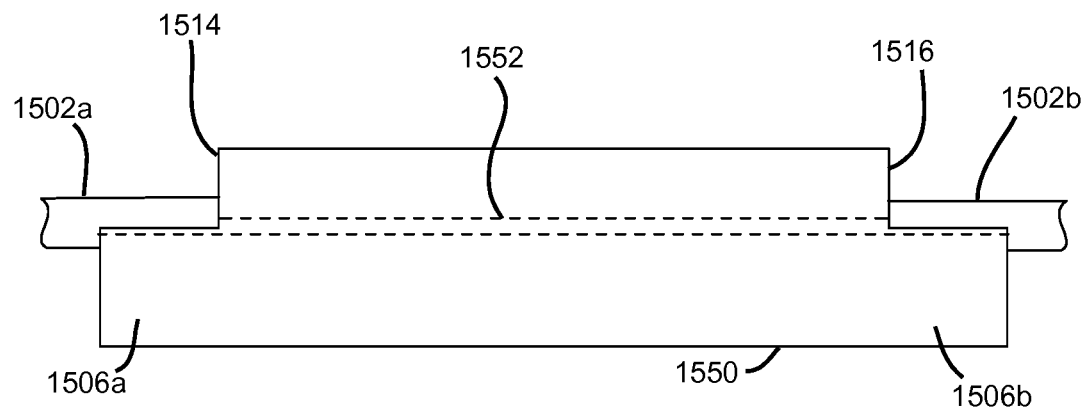
FIG. 15 schematically illustrates a waveguide device according to an embodiment of the present invention having optical fibers coupled to two ends of the device.

Another embodiment of a fiber-coupled device according to the present invention is shown schematically in FIG. 15. The device 1500 includes a substrate 1550 with fiber attachment portions 1506a and 1506b at each end. Thus one or more fibers 1502a at the first end 1514 and one or more fibers 1502b at the second end 1516 may be used to introduce light to and/or away from a waveguide device 1552 written in the substrate 1550. The fibers 1502a and 1502b may be attached at their respective fiber attachment portions 1506a and 1506b. The ends 1516 may be prepared using the techniques discussed above with regard to FIGS. 14A-C, with fiber alignment recesses formed at each end to receive the fibers 1502a, 1502b. Furthermore, the waveguide device 1552 may be written in the substrate 1550 using a 3-D femtosecond laser writing technique similar to that discussed above for with regard to FIGS. 14D and E for the waveguides 1412. Different types of waveguide devices 1552, both passive and active, may be written into the substrate 1550.

Figure 16:
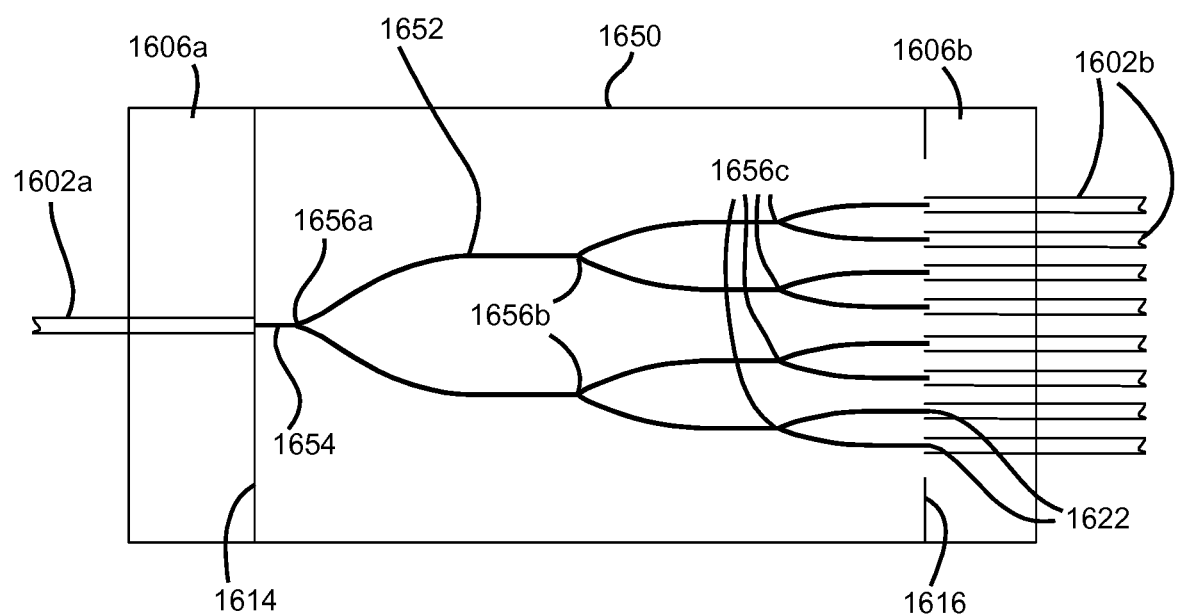
FIG. 16 schematically illustrates a waveguide splitter device on a fiber-coupled substrate according to an embodiment of the present invention.

Passive waveguide devices 1552 that may be formed in the substrate 1550 include splitters, filters and the like. For example, an example of a fiber-coupled splitter device 1650 is schematically illustrated in FIG. 16. In this embodiment, the splitter device 1650 includes a waveguide splitter network 1652 that includes a single waveguide 1654 coupled to a first fiber 1602a at the first end 1614, and three sets of 1:2 splitter nodes 1656a-1656c, resulting in eight waveguide outputs 1622 into eight output fibers 1602b at the second end 1616. In some embodiments the splitter nodes 1656a-1656c may be symmetrical splitter nodes, equally splitting light propagating from the left into two components of equal power propagating to the right. In other embodiments one or more of the splitter nodes may 1656a-1656c may be asymmetrical splitter nodes, so that light is not split equally between the two outputs from the splitter node 1656a-1656c.

In this and following illustrations some waveguides are illustrated with a single line on a substrate, for simplicity. It should be appreciated that this is not intended to indicate that the cross-section dimensions of the waveguides are constant along their lengths and that the waveguides may have expanded core dimensions close to the substrate edge for coupling to external optical fibers, in the manner described above.

Figure 17:
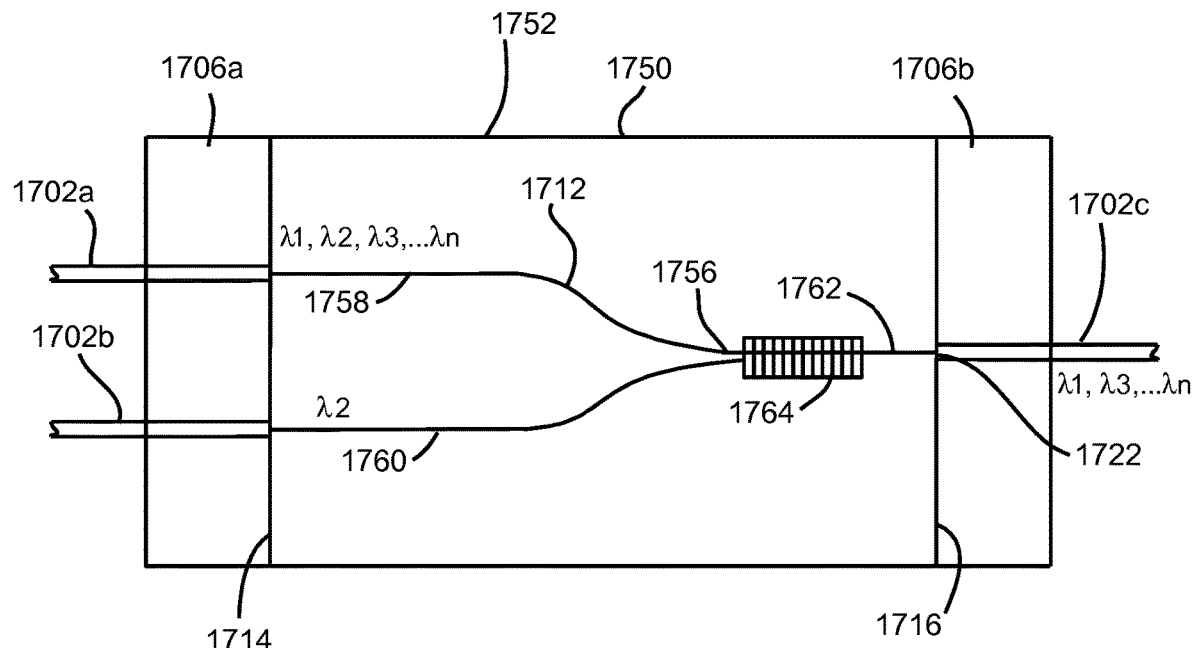
FIG. 17 schematically illustrates a waveguide add/drop filter device on a fiber-coupled substrate according to an embodiment of the present invention.

Another type of waveguide device that may be implemented in a fiber-coupled substrate 1750 according to an embodiment of the invention is an add/drop filter, an exemplary embodiment of which is schematically illustrated in FIG. 17. Fibers 1702a and 1702b are attached to the substrate 1750 at fiber attachment region 1706a, for example using the techniques discussed above. Also, fiber 1702c is attached to the substrate 1750 at fiber attachment region 1706b, for example using the techniques discussed above. The device 1752 includes a waveguide arrangement 1712 that has a first waveguide branch 1758 leading from fiber 1702a and a second waveguide branch 1760 leading from fiber 1702b. The two branches 1758 and 1760 meet at a waveguide grating 1764. The third branch 1762 is coupled to fiber 1702c. In this illustrated embodiment, the waveguide grating 1764 has the property of reflecting light at a wavelength $\lambda 2$. The add/drop filter operates in the following manner. If a combination of light wavelengths $\lambda 1, \lambda 2, \lambda 3 \ldots \lambda n$ enters the device 1752 at the first end 1714 via fiber 1702a, the light passes into the third branch 1762 and is incident at the waveguide grating 1764. At least a portion of the light at wavelength $\lambda 2$, and in some embodiments preferably most or all of the light at wavelength $\lambda 2$, is reflected at the waveguide grating 1764 and passes out of the device 1752 along fiber 1702b. The light that is not reflected by the grating 1764, i.e. at wavelengths $\lambda 1, \lambda 3 \ldots \lambda n$, is transmitted out of the device at waveguide output 1722 into fiber 1702c. Operated in reverse, if light at wavelengths $\lambda 1, \lambda 3 \ldots \lambda n$ is injected into the second end 1716 via fiber 1702c and at wavelength $\lambda 2$ is injected into the first end 1714 via fiber 1702b, light at a combination of wavelengths $\lambda 1, \lambda 2, \lambda 3 \ldots \lambda n$ will exit the device via fiber 1702a.

It will be appreciated that many variations of this device 1752 are possible, some of which may include the addition of more fibers to the substrate. For example, the device 1752 may include a waveguide optical circulator. Also, additional stages with gratings reflective at different wavelengths may be included so as to permit the adding and dropping of light at different wavelengths. Accordingly, the device may be provided with different numbers of fibers to permit the exit and entry of light at different wavelengths.

Other embodiments may include different optical waveguide elements to produce different optical functions.

Figure 18:
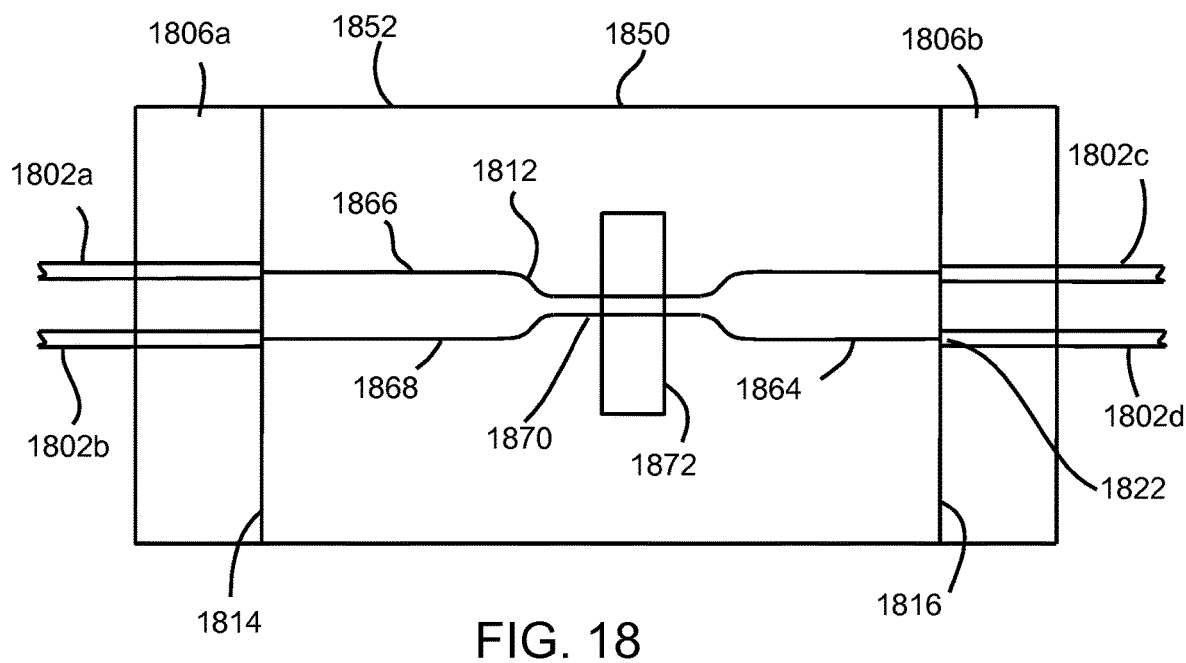
FIG. 18 schematically illustrates a switching device on a fiber-coupled substrate according to an embodiment of the present invention.

Another exemplary embodiment of a device 1852 that may be provided on a fiber-coupled substrate according to the present invention is schematically illustrated in FIG. 18. The device 1852 includes fibers 1802a and 1802b attached to the substrate 1850 at a fiber attachment section 1806a at the first end 1814 and fibers 1802c and 1802d attached at a fiber attachment section 1806b at the second end 1816. A waveguide structure 1812 includes a first waveguide 1866 leading between fibers 1802a and 1802c and a second waveguide 1868 leading between fibers 1802b and 1802d. At a waveguide coupling portion 1870 the two waveguides are closer together in the substrate than at the ends of the substrate 1814 and 1816. An externally controlled coupling mechanism 1872 is provided at the waveguide coupling portion to controllably permit the coupling of light between waveguides 1866 and 1868. Thus, when the externally controlled coupling mechanism 1872 is in one state, light propagating along waveguide 1866 from fiber 1802a propagates all the way to fiber 1802c undisturbed. When the coupling mechanism 1872 is in another state, light propagating along waveguide 1866 is coupled into second waveguide 1868 and exits the device via fiber 1802d.

The externally controlled coupling mechanism 1872 may be any suitable, actively controlled mechanism deployable on the substrate 1850. For example, the mechanism may be a microfluidic mechanism that controls the effective refractive index surrounding the waveguides in the coupling portion 1870. One approach to implementing microfluidic switching is described in U.S. Pat. No. 7,283,696, incorporated herein by reference. Other externally controllable coupling mechanisms may be used, for example using liquid crystals or nonlinear optical materials. In the case of a nonlinear optical crystal, the entire substrate and fiber attachment sections may be formed from a single nonlinear optical crystal, and waveguide devices written into the substrate, such as electro-optical switches, Mach-Zehnder interferometers and the like. Additionally, nonlinear optical material devices may be integrated into a glass or polymer substrate that includes the fiber attachment sections and waveguides.

Figure 19A:
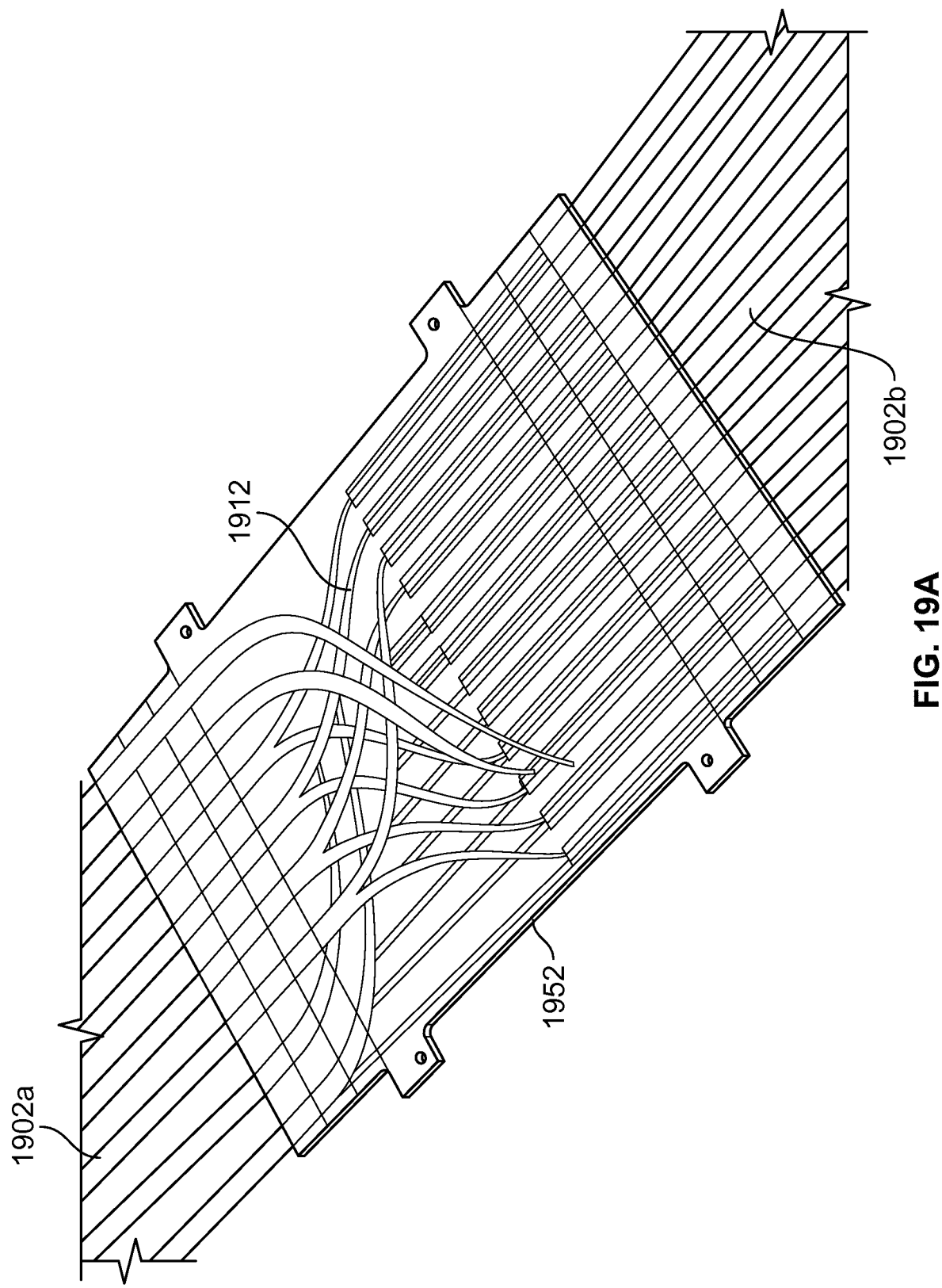
FIGS. 19A and 19B schematically illustrate a fiber-coupled substrate device incorporated in a flex-fiber configuration according to an embodiment of the present invention.
Figure 19B:
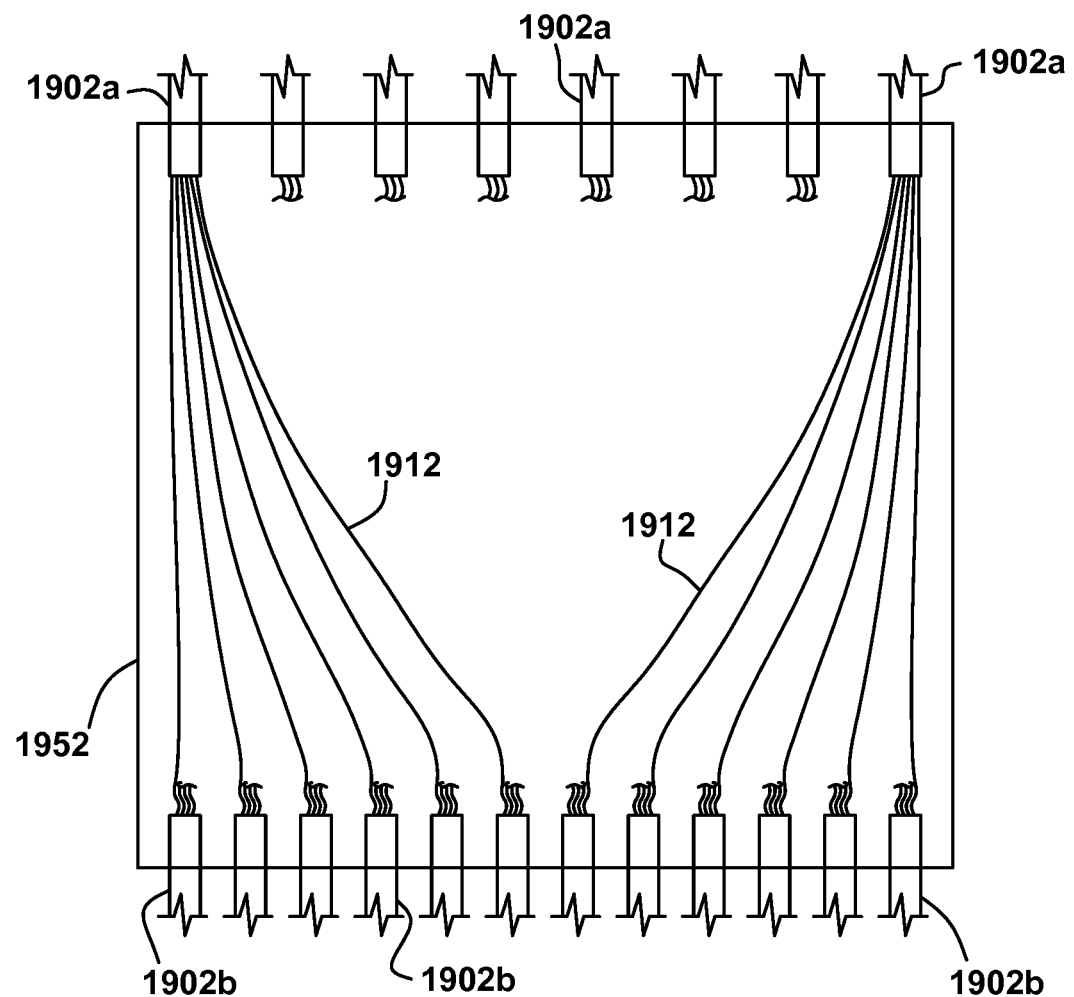

A device as described herein having fibers coupled at each end of the substrate may find use in optical communications and data transfer. For example, the fibers entering at the side of the device may be in the form of a fiber ribbon or flex-foil, as is schematically illustrated in FIGS. 19A-19B. The device 1952 is coupled to a first set of fibers 1902a at a first side and a second set of fibers 1902b at a second side. In the illustrated embodiment the device 1952 is a mixing pass-through device with waveguides 1912 coupling fibers 1902a to respective fibers 1902b in a different spatial order.

While various examples were provided above, the present invention is not limited to the specifics of the examples. For example, a fiber-coupled substrate may include many different types of waveguide devices, including both passive and active, and may require various numbers of fibers to be attached at either end of the substrate.

As noted above, the present invention is applicable to optical fiber communication and data transfer systems. Accordingly, the present invention should not be considered limited to the particular examples described above, but rather should be understood to cover all aspects of the invention as fairly set out in the attached claims. Various modifications, equivalent processes, as well as numerous structures to which the present invention may be applicable will be readily apparent to those of skill in the art to which the present invention is directed upon review of the present specification. The claims are intended to cover such modifications and devices.

LIST OF REFERENCE NUMERALS AND CORRESPONDING FEATURES 100 fiber optic connector
102 fibers
104 coupler
204 coupler
206 attachment section
208 waveguide section
210 alignment recess
212 output coupling face
214 attachment section cover
302 waveguide
304 waveguide coupler
306 fiber attachment section
308 waveguide section
310 fiber alignment recess
312 waveguide

| 312a | larger waveguide cores |
| 314 | first end |
| 316 | second end |
| 318 | tapered region |
| 404 | coupler |
| 410 | fiber alignment features |
| 414 | first end |
| 420 | associated waveguide inputs |
| 504 | coupler |
| 508 | waveguide section |
| 516 | second end |
| 522 | expanded waveguide outputs |
| 602 | fiber |
| 604 | coupler |
| 610 | fiber alignment recess |
| 612 | onve waveguide |
| 616 | second end |
| 618 | tapered region |
| 620 | waveguide input |
| 622 | waveguide output |
| 624 | fiber core |
| 628 | fiber core output |
| 702 | fiber |
| 704 | coupler |
| 710 | fiber alignment recess |
| 712 | one waveguide |
| 718 | grin section |
| 720 | waveguide input |
| 722 | waveguide output |
| 723 | angled face |
| 724 | fiber core |
| 726 | fiber core output |
| 802a | fibers |
| 802b | fibers |
| 804 | coupler |
| 806 | fiber alignment section |
| 810a | fiber alignment recesses |
| 810b | fiber alignment recesses |
| 812a | waveguides |
| 812b | waveguides |
| 816 | second end |
| 820a | inputs |
| 820b | inputs |
| 822a | waveguide inputs |
| 822b | waveguide outputs |
| 1002b | fibers |
| 1102a | fibers |
| 1102b | fibers |
| 1104 | couplers |
| 1104a | first couplers |
| 1104b | couplers |
| 1112a | waveguides |
| 1112b | tapered waveguide |
| 1122a | expanded waveguide outputs |
| 1122b | expanded ports |
| 1202a | fibers |
| 1202b | fibers |
| 1204a | coupler |
| 1204b | coupler |
| 1228a | cover |
| 1228b | cover |
| 1230 | locating pin recess |
| 1230a | attachment protrusions |
| 1230b | attachment protrusions |
| 1232a | attachment receiving slots |
| 1232b | attachment receiving slots |
| 1406 | fiber attachment section |
| 1410 | fiber alignment recesses |
| 1412 | entire waveguide |
| 1418 | expanded core section |
| 1420 | waveguide input |
| 1422 | waveguide output |
| 1438 | substrate |
| 1440 | laser |
| 1442 | portion |
| 1444 | laser focus |
| 1446 | ledge |
| 1500 | device |
| 1502a | fibers |
| 1502b | fibers |
| 1506a | fiber attachment portions |
| 1506b | fiber attachment portions |
| 1514 | first end |
| 1516 | ends |
| 1550 | substrate |
| 1552 | passive waveguide devices |
| 1602a | first fiber |
| 1602b | eight output fibers |
| 1614 | first end |
| 1616 | second end |
| 1622 | eight waveguide outputs |
| 1650 | fiber-coupled splitter device |
| 1652 | waveguide splitter network |
| 1654 | single waveguide |
| 1656a | splitter node |
| 1702a | fiber |
| 1702b | fiber |
| 1702c | fiber |
| 1706a | fiber attachment region |
| 1706b | fiber attachment region |
| 1712 | waveguide arrangement |
| 1714 | first end |
| 1716 | second end |
| 1722 | waveguide output |
| 1750 | fiber-coupled substrate |
| 1752 | device |
| 1758 | first waveguide branch |
| 1760 | second waveguide branch |
| 1762 | third branch |
| 1764 | grating |
| 1802a | fiber |
| 1802b | fibers |
| 1802c | fiber |
| 1802d | fiber |
| 1806a | fiber attachment section |
| 1806b | fiber attachment section |
| 1812 | waveguide structure |
| 1814 | first end |
| 1816 | second end |
| 1850 | substrate |
| 1852 | device |
| 1866 | first waveguide |
| 1868 | second waveguide |
| 1870 | coupling portion |
| 1872 | coupling mechanism |
| 1902a | coupling fibers |
| 1902b | fibers |
| 1912 | waveguides |
| 1952 | device |

What is claimed is:

1. An optical fiber connector comprising:
a first coupler formed of a substrate, the substrate having a waveguide section integrally formed with a fiber attachment section, the waveguide section having a first end and a second end,
a first unbranched waveguide disposed in the waveguide section to lead light between the first end of the waveguide section and the second end of the waveguide section, the first waveguide having a first core cross-section at the first end of the waveguide section and a second core cross-section at the second end of the waveguide section, the second core cross-section having an area larger than an area of the first core cross-section,
the fiber attachment section having a first surface with a first alignment recess formed on the first surface; and
a first optical fiber having a first fiber core, the first optical fiber attached to the first coupler at the fiber attachment section and aligned by the first alignment recess so that the first fiber core is aligned with the first end of the first waveguide;
wherein an optical beam from the fiber is expanded on propagating along the first unbranched waveguide from the first end to the second end of the waveguide section.

2. An optical fiber connector recited in claim 1, further comprising a first connector cover over the first coupler, the first connector cover comprising an attachment mechanism configured to attach the first connector cover to another connector cover.

3. An optical fiber connector as recited in claim 2, further comprising a second coupler having a waveguide section integrally formed with a fiber attachment section, at least one optical fiber attached to the second coupler, and a second cover over the second coupler, the second cover comprising an attachment mechanism for attaching to the attachment mechanism of the first cover.

4. An optical fiber connector as recited in claim 2, wherein the first connector cover is disposed around at least four sides of the coupler.

5. An optical fiber connector recited in claim 1, further comprising an attachment section cover over a portion of the first optical fiber at the fiber attachment section.

6. An optical fiber connector as recited in claim 1, wherein the fiber attachment section is located at the first end of the waveguide section.

7. An optical fiber connector as recited in claim 1, wherein the first waveguide comprises a GRIN lens section.

8. An optical fiber connector as recited in claim 1, further comprising
a second unbranched waveguide disposed in the waveguide section to lead light between the first end of the waveguide section and the second end of the waveguide section, the second waveguide having a third core cross-section at the first end of the waveguide section and a fourth core cross-section at the second end of the waveguide section, the fourth core cross-section having an area larger than an area of the third core cross-section,
the fiber attachment section having a second alignment recess formed on the first surface, and
a second optical fiber having a second fiber core, the second fiber being attached to the first coupler at the fiber attachment section, and aligned by the second alignment recess so that the second fiber core is aligned with the second waveguide.

9. An optical fiber connector as recited in claim 8, further comprising
a third unbranched waveguide disposed in the waveguide section to lead light between the first end of the waveguide section and the second end of the waveguide section, the third waveguide having a fifth core cross-section at the first end of the waveguide section and a sixth core cross-section at the second end of the waveguide section, the sixth core cross-section having an area larger than an area of the fifth core cross-section,
the fiber attachment section having a third alignment recess, and
a third optical fiber having a third fiber core, the third fiber being attached to the first coupler at the fiber attachment section, and aligned by the third alignment recess so that the third fiber core is aligned with the third waveguide.

10. An optical fiber connector as recited in claim 9, wherein the third alignment recess is on the first surface of the fiber attachment section.

11. An optical fiber connector as recited in claim 9, wherein the third alignment recess is on a second surface of the fiber attachment section, the first and second waveguides lie substantially in a first plane of the substrate and the third waveguide is displaced relative to the first plane.

12. An optical fiber connector as recited in claim 11, further comprising
a fourth unbranched waveguide disposed in the waveguide section to lead light between the first end of the waveguide section and the second end of the waveguide section, the third waveguide and the fourth waveguide forming a second plane in the substrate, the second plane being parallel to, and displaced from, the first plane, the fourth waveguide having a seventh core cross-section at the first end of the waveguide section and an eighth core cross-section at the second end of the waveguide section, the eighth core cross-section having an area larger than an area of the seventh core cross-section,
the fiber attachment section having a fourth alignment recess on the second surface of the attachment section, and
a fourth optical fiber having a fourth fiber core, the fourth fiber being attached to the first coupler at the fiber attachment section, and aligned by the fourth alignment recess so that the fourth fiber core is aligned with the fourth waveguide.

13. An optical fiber connector as recited in claim 1, further comprising an anti-reflection coating on an output end of the waveguide section opposite the fiber attachment section.

14. An optical fiber connector as recited in claim 1, wherein the substrate is formed from glass.

15. An optical fiber connector as recited in claim 1, wherein the alignment recess is a V-groove.

16. An optical fiber connector as recited in claim 1, wherein the first waveguide terminates at the second end of the waveguide section, the second end of the waveguide section being free of fiber alignment features.

17. An optical fiber connector as recited in claim 16, further comprising a first connector cover over the first coupler, the first connector cover comprising an attachment mechanism configured to attach the first connector cover to another connector cover.

18. An optical fiber connector as recited in claim 17, further comprising
a second unbranched waveguide disposed in the waveguide section to lead light between the first end of the waveguide section and the second end of the waveguide section, the second waveguide having a third core cross-section at the first end of the waveguide section and a fourth core cross-section at the second end of the waveguide section, the fourth core cross-section having an area larger than an area of the third core cross-section, the fiber attachment section having a second alignment recess formed on the first surface, and a second optical fiber having a second fiber core, the second fiber being attached to the first coupler at the fiber attachment section, and aligned by the second alignment recess so that the second fiber core is aligned with the second waveguide.

19. An optical fiber connector as recited in claim 18, wherein the second end of the waveguide section comprises an output end of the waveguide section and further comprising an anti-reflection coating on the output end of the waveguide section.

20. An optical fiber connector as recited in claim 16, further comprising a second unbranched waveguide disposed in the waveguide section to lead light between the first end of the waveguide section and the second end of the waveguide section, the second waveguide having a third core cross-section at the first end of the waveguide section and a fourth core cross-section at the second end of the waveguide section, the fourth core cross-section having an area larger than an area of the third core cross-section, the fiber attachment section having a second alignment recess formed on the first surface, and a second optical fiber having a second fiber core, the second fiber being attached to the first coupler at the fiber attachment section, and aligned by the second alignment recess so that the second fiber core is aligned with the second waveguide.

21. An optical fiber connector as recited in claim 16, wherein the second end of the waveguide section comprises an output end of the waveguide section and further comprising an anti-reflection coating on the output end of the waveguide section.

\* \* \* \* \*